United States Patent
Moegling et al.

(10) Patent No.: US 7,163,264 B1
(45) Date of Patent: Jan. 16, 2007

(54) HEAD RESTRAINT WITH INTEGRATED TETHER ANCHOR

(75) Inventors: Peter James Moegling, Brighton, MI (US); Vasudeva Sankarshana Murthy, Ann Arbor, MI (US); Michael Anthony Zielinski, Novi, MI (US)

(73) Assignee: Toyota Technical Center, USA, Inc., Ann Arbor, MI (US)

( * ) Notice: Subject to any disclaimer, the term of this patent is extended or adjusted under 35 U.S.C. 154(b) by 0 days.

(21) Appl. No.: 11/290,224

(22) Filed: Nov. 30, 2005

(51) Int. Cl.
*A47C 1/08* (2006.01)
(52) U.S. Cl. ................................... 297/253
(58) Field of Classification Search ............. 297/253, 297/254, 391
See application file for complete search history.

(56) References Cited

U.S. PATENT DOCUMENTS 6,729,687 B1 * 5/2004 Haverkamp ............. 297/254
6,869,141 B1 * 3/2005 Yamaoka et al. ......... 297/253
2004/0090694 A1 5/2004 Chickanosky
2004/0090895 A1 5/2004 Lee et al.

FOREIGN PATENT DOCUMENTS

JP  2004114917 A * 4/2004

\* cited by examiner

*Primary Examiner*—Anthony D. Barfield
(74) *Attorney, Agent, or Firm*—Gifford, Krass, Groh, Sprinkle, Anderson & Citkowski, P.C.

(57) ABSTRACT

A head restraint for use with a seat assembly of an automotive vehicle includes a rigid frame and a plate. The rigid frame has spaced apart and generally upright side members. Each of the side members has an upper end and a lower end. The rigid frame includes a cross member that extends between the upper ends of the side members. The plate is fixedly secured to the side members. The plate is positioned adjacent the lower ends.

12 Claims, 2 Drawing Sheets

HEAD RESTRAINT WITH INTEGRATED TETHER ANCHOR

BACKGROUND OF THE INVENTION

1. Field of the Invention

The invention relates to seat assemblies for automotive vehicles. More particularly, the invention relates to a halo-type head restraint having an integrated tether anchor.

2. Description of the Related Art

An automotive vehicle includes a passenger compartment and rows of seat assemblies for supporting passengers within the passenger compartment. A seat assembly includes a seat cushion and a seat back. A seat assembly also typically includes a head restraint for supporting the head of an occupant of the seat assembly. A head restraint includes a rigid frame, an elastic foam pad and a cut and sewn trim cover for covering both the frame and the foam pad. Some head restraint designs have a "halo" shape, wherein a hole or opening is defined in the center of the head restraint to provide fore and aft visibility through the head restraint.

It is also common for a seat assembly to include a closed loop tether anchor for connecting and securing a child seat restraint thereto. It remains desirable to provide a halo style head restraint that incorporates a top-located tether anchor.

SUMMARY OF THE INVENTION

According to one aspect of the invention, a head restraint is provided for use with a seat assembly of an automotive vehicle. The head restraint includes a rigid frame and a plate. The rigid frame has spaced apart and generally upright side members. Each of the side members has an upper end and a lower end. The rigid frame includes a cross member that extends between the upper ends of the side members. The plate is fixedly secured to the side members. The plate is positioned adjacent the lower ends of the side members. The plate has a hole that allows attachment of a hook therethrough.

BRIEF DESCRIPTION OF THE DRAWINGS

Advantages of the present invention will be readily appreciated as the same becomes better understood by reference to the following detailed description when considered in connection with the accompanying drawings, wherein.

DETAILED DESCRIPTION OF THE INVENTION

The invention provides a halo head restraint design that improves over conventional head restraint designs by providing a tether anchor that allows attachment of a hook on an end of a belt from a child seat.

Figure 2:
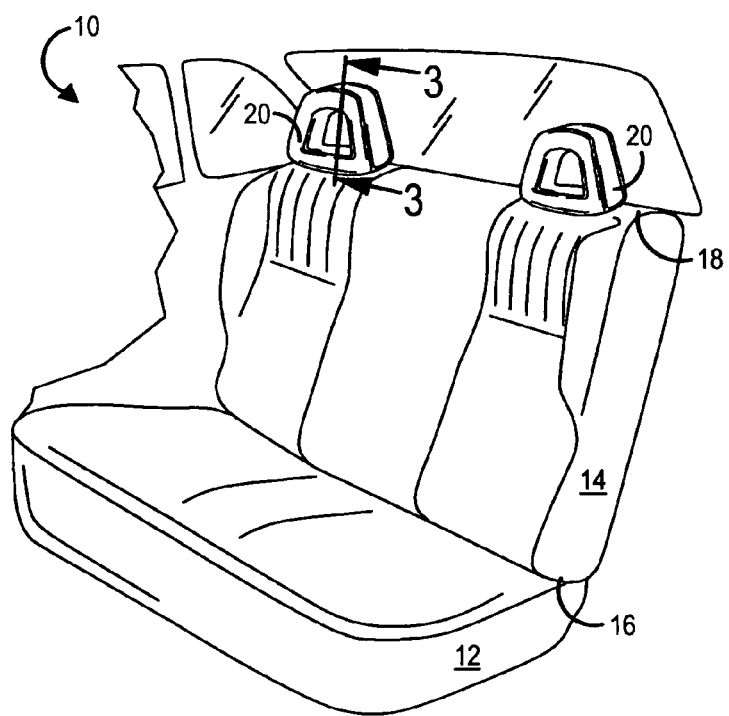
FIG. 2 is a perspective view of a seat assembly incorporating the head restraint of FIG. 1.

Referring to FIG. 2, a seat assembly is generally indicated at 10. The seat assembly 10 includes a generally horizontal seat cushion 12 and a generally upright seat back 14. The seat back 14 includes a bottom and 16 and an opposite top end 18. A head restraint 20 is mounted to the top end 18 of the seat back 14.

Figure 1:
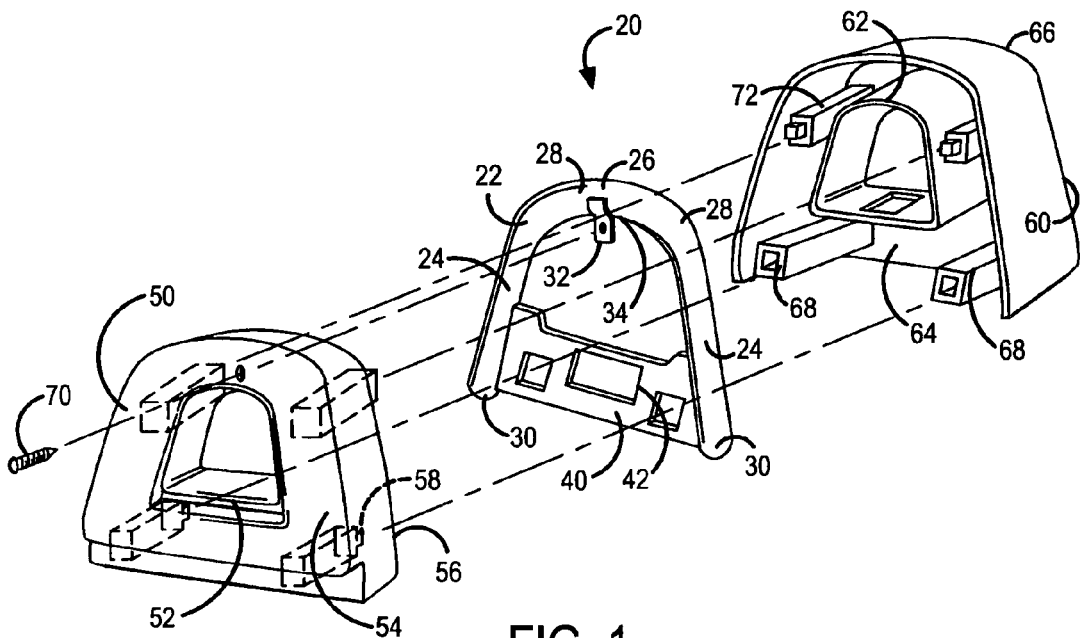
FIG. 1 is an exploded perspective view of a head restraint according to one embodiment of the invention.
Figure 3:
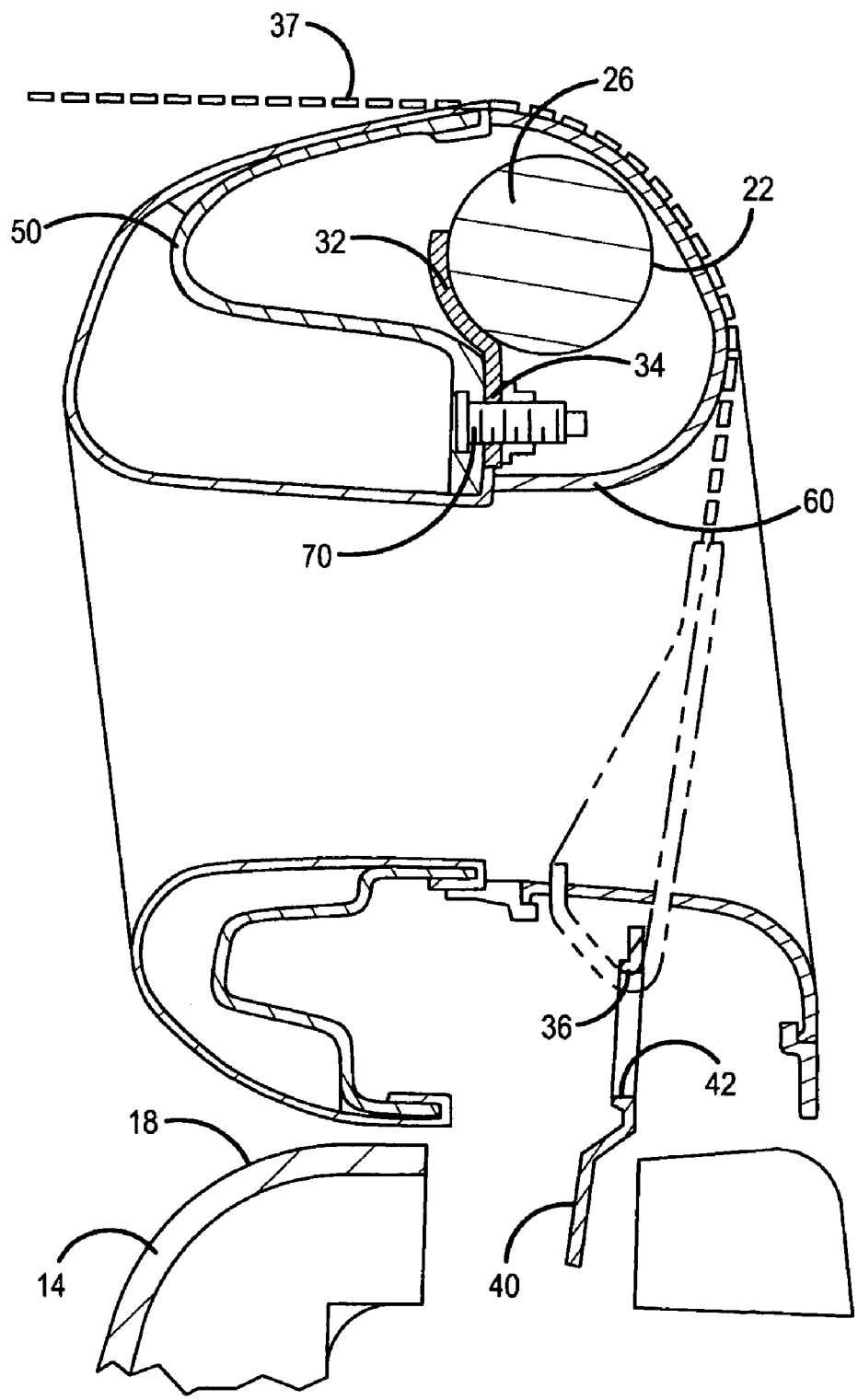
FIG. 3 is a cross sectional view of the head restraint, as taken through a plane indicated at A in FIG. 2.

Referring to FIGS. 1 and 3, the head restraint 20 includes a rigid frame 22. The frame 22 includes a body having a pair of side members 24 and a cross member 26. The side members 24 extend generally upright from the top end 18 of the seat back 14. The side members 24 are spaced apart. The side members 24 each extend between an upper end 28 and a lower end 30. The cross member 26 extends between the upper ends 28 of the side members 24. Preferably, the side members 24 and the cross member 26 are integrally formed as a unit. Most preferably, the side members 24 and cross member 26 are arranged in a generally "U" shape. It should be appreciated, however, that the body of the head restraint 20 can also be rectangularly shaped, with a corresponding rectangular opening extending therethrough. A bracket 32 extends outwardly from the cross member 26. A bore 34 is formed in the bracket 32. It should be appreciated, however, the side members 24 and cross member 26 can be arranged in any shape, such as a square, rectangle and the like.

A plate 40 is fixedly secured to the lower ends 30 of the side members 24. The plate 40 is spaced apart from the cross member 26, such that an opening is defined between the plate 40, cross member 26 and side members 24. A hole 42 is formed in the plate 40 to receive a hook 36 at an end of a child restraint seat tether strap 37. Preferably, the hole 42 is rectangular, as shown in the figures, having dimensions in accordance with FMVSS 225.

The head restraint 20 includes a front cover 50 for covering front sides of the frame 22 and the plate 40. The front cover 50 has an opening 52 that corresponds to the space defined between the side members 24. The front cover 50 has an outer surface 54 for supporting the head of an occupant of the seat assembly 10. Preferably, the front cover 50 includes a foam pad 55 covered by a trim cover 57, as known by those of ordinary skill in the art. The front cover 50 has an inner surface 56 opposite the outer surface 54. A locating pin 58 extends axially from the inner surface 56.

The head restraint 20 also includes a rear cover 60 for covering rear sides of the frame 22 and the plate 40. The rear cover 60 has an opening 62 that corresponds with the opening 52 of the front cover 50. The rear cover 60 has opposite inner 64 and outer 66 surfaces. A tubular boss 68 extends axially from the inner surface 64 of the rear cover 60 for receiving the locating pin 58 during assembly of the head restraint 20.

The front 50 and rear 60 covers are fixedly secured to the frame 22 by conventional means, such as screws, clips, and barb-type fasteners. Preferably, as shown in FIG. 1, a screw 70 is inserted through a hole in the front cover 50 and the bore 54 in the bracket 32 of the frame 22. The screw 70 threadingly engages a corresponding boss 72 extending from the inner surface 64 of the rear cover 60, thereby securing both the front 50 and rear 60 covers to the frame 22. Additionally, the pin 58 of the front cover 50 extends through the boss 68 of the rear cover 60. The pin 58 and boss 68 pass through a corresponding aperture 78 in the plate, so that the front 50 and rear 60 covers are located with respect to the frame 22.

In use, the child restraint seat tether strap 37 extends over the top of the head restraint 20. The hook 36 is passed and hooked through the hole 42 in the plate 40. The strap 37 is tightened so that the hook 36 remains hooked on the plate 40, thereby securing the child seat (not shown) to the seat assembly 10.

The invention has been described in an illustrative manner. It is, therefore, to be understood that the terminology used is intended to be in the nature of words of description rather than of limitation. Many modifications and variations of the invention are possible in light of the above teachings. Thus, within the scope of the appended claims, the invention may be practiced other than as specifically described.

We claim:

1. A head restraint for use with a seat assembly of an automotive vehicle, said head restraint comprising:
    a body for supporting the head of an occupant of the seat assembly, said body having an opening extending therethrough, said body including a frame having spaced apart side members; and
    a tether anchor fixedly secured to said body to allow attachment of a hook to said head restraint, said tether anchor being positioned substantially below said opening in said body, said tether anchor being a plate fixedly secured to said side members, said plate having a hole that receives the hook therethrough.

2. The head restraint as set forth in claim 1, wherein each of said side members has an upper end and a lower end, said rigid frame including a cross member that extends between said upper ends of said side members.

3. The head restraint as set forth in claim 1 including a front cover for covering front sides of said rigid frame and said plate, said front cover having an opening corresponding with a space defined between said side members, said front cover having an outer surface for supporting the head of an occupant of the seat assembly, said cover having an inner surface opposite said outer surface, said front cover having a pin that extends axially from said inner surface.

4. The head restraint as set forth in claim 3 including a rear cover for covering rear sides of said rigid frame and said plate, said rear cover having an opening corresponding with said opening of said front cover, said rear cover having opposite inner and outer surfaces, said outer surface of rear cover being opposite said outer surface of said front cover, said inner surface of said rear cover having a tubular boss extending axially therefrom, said boss receiving said pin therein during assembly of said front and rear covers to said frame.

5. The head restraint as set forth in claim 4, wherein said plate includes an aperture to accommodate said pin and said boss therethrough during assembly of said front and rear covers to said frame.

6. The head restraint as set forth in claim 4, wherein said frame includes a bracket having a bore allowing assembly of said front and rear covers therethrough with a fastener.

7. A seat assembly comprising:
    a seat cushion
    a seat back having a lower end positioned adjacent said seat cushion, said seat back having a top end opposite said lower end; and
    a head restraint disposed adjacent said top end of said seat back, said head restraint having:
        a body for supporting the head of an occupant of the seat assembly, said body having an opening extending therethrough; and
        a tether anchor fixedly secured to said body of said head restraint to allow attachment of a hook thereto, said tether anchor being positioned substantially below said opening in said body and spaced above said top end of said seat back.

8. The head restraint as set forth in claim 7, wherein said body includes a rigid frame having spaced apart and generally upright side members, each of said side members having an upper end and a lower end, said rigid frame including a cross member that extends between said upper ends of said side members.

9. The head restraint as set forth in claim 8, wherein said tether anchor is a plate fixedly secured to said side members, said plate being positioned adjacent said lower ends of said side members, said plate having a hole that allows attachment of the hook therethrough.

10. A seat assembly comprising:
    a seat cushion
    a seat back having a lower end positioned adjacent said seat cushion, said seat back having a top end opposite said lower end;
    a head restraint disposed on said top end of said seat back, said bead restraint having:
        a rigid frame having spaced apart and generally upright side members, each of said side members having an upper end and a lower end, said rigid frame including a cross member that extends between said upper ends of said side members; and
        a plate fixedly secured to said side members, said plate positioned adjacent said lower ends of said side members, said plate having a hole that allows attachment of a hook therethrough; and
    a front cover for covering front sides of said rigid frame and said plate, said front cover having a hole corresponding with a space defined between said side members, said front cover having an outer surface for supporting the head of an occupant of the seat assembly, said cover having an inner surface opposite said outer surface, said front cover having a pin that extends axially from said inner surface.

11. The bead restraint as set forth in claim 10 including a rear cover for covering rear sides of said rigid frame and said plate, said rear cover having a hole corresponding with said hole of said front cover, said rear cover having opposite inner and outer surfaces, said outer surface of rear cover being opposite said outer surface of said front cover, said inner surface of said rear cover having a tubular boss extending axially therefrom, said boss receiving said pin therein during assembly of said front and rear covers to said frame.

12. The head restraint as set forth in claim 11, wherein said plate includes an aperture to accommodate said pin and said boss therethrough during assembly of said front and rear covers to said frame.

* * * * *

UNITED STATES PATENT AND TRADEMARK OFFICE
CERTIFICATE OF CORRECTION

| | |
|---|---|
| PATENT NO. | : 7,163,264 B1 |
| APPLICATION NO. | : 11/290224 |
| DATED | : January 16, 2007 |
| INVENTOR(S) | : Peter J. Moegling et al. |

It is certified that error appears in the above-identified patent and that said Letters Patent is hereby corrected as shown below:

Column 1, line 65, replace "and 16" with --end 16--

Column 3, line 47, replace "cushion" with --cushion;--

Column 4, line 17, replace "cushion" with --cushion;--

Signed and Sealed this

Tenth Day of April, 2007

JON W. DUDAS
*Director of the United States Patent and Trademark Office*